Feb. 24, 1931. T. E. MARKLEY 1,793,707
SUPPORT
Filed Jan. 6, 1930  2 Sheets-Sheet 1
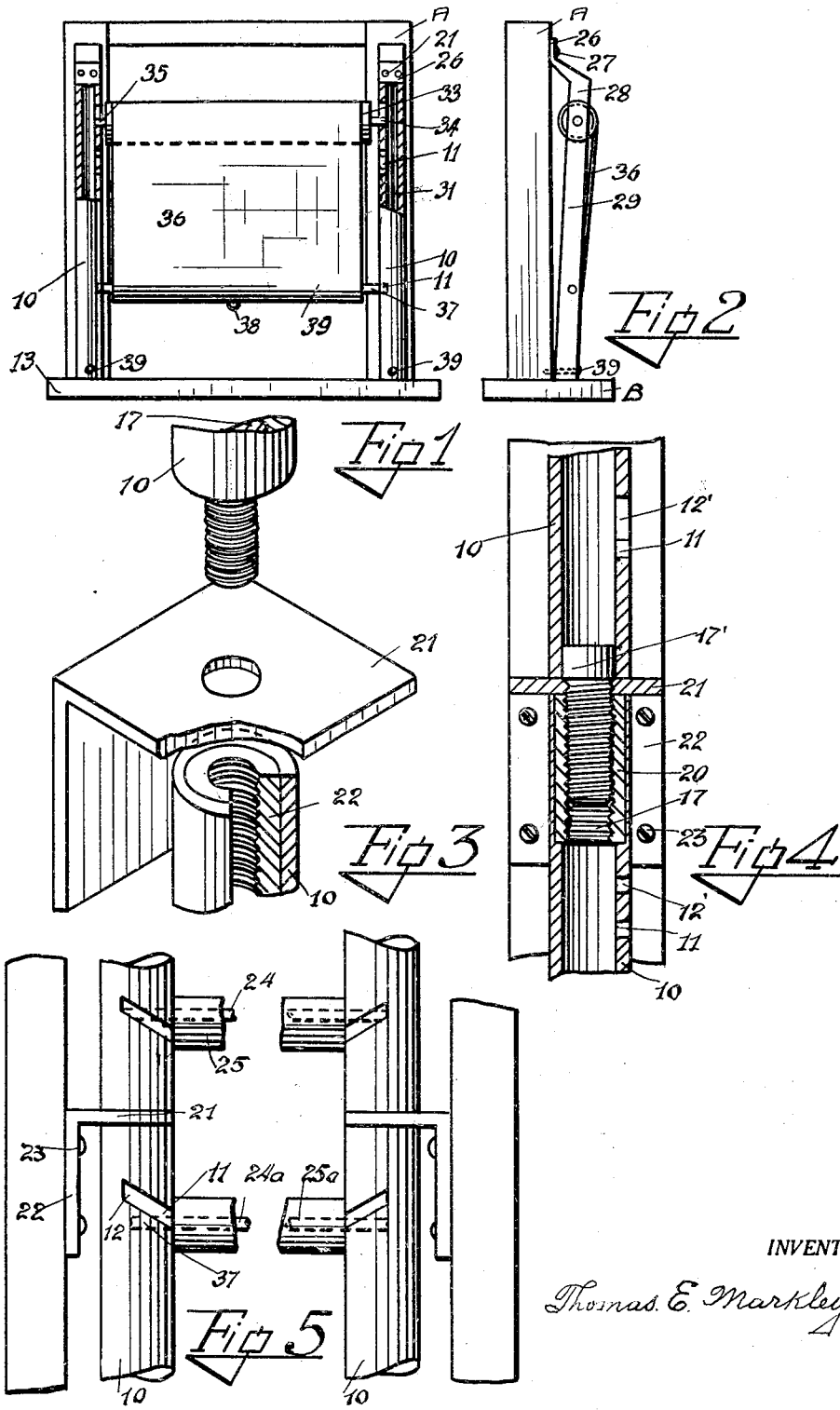
INVENTOR.
Thomas E. Markley

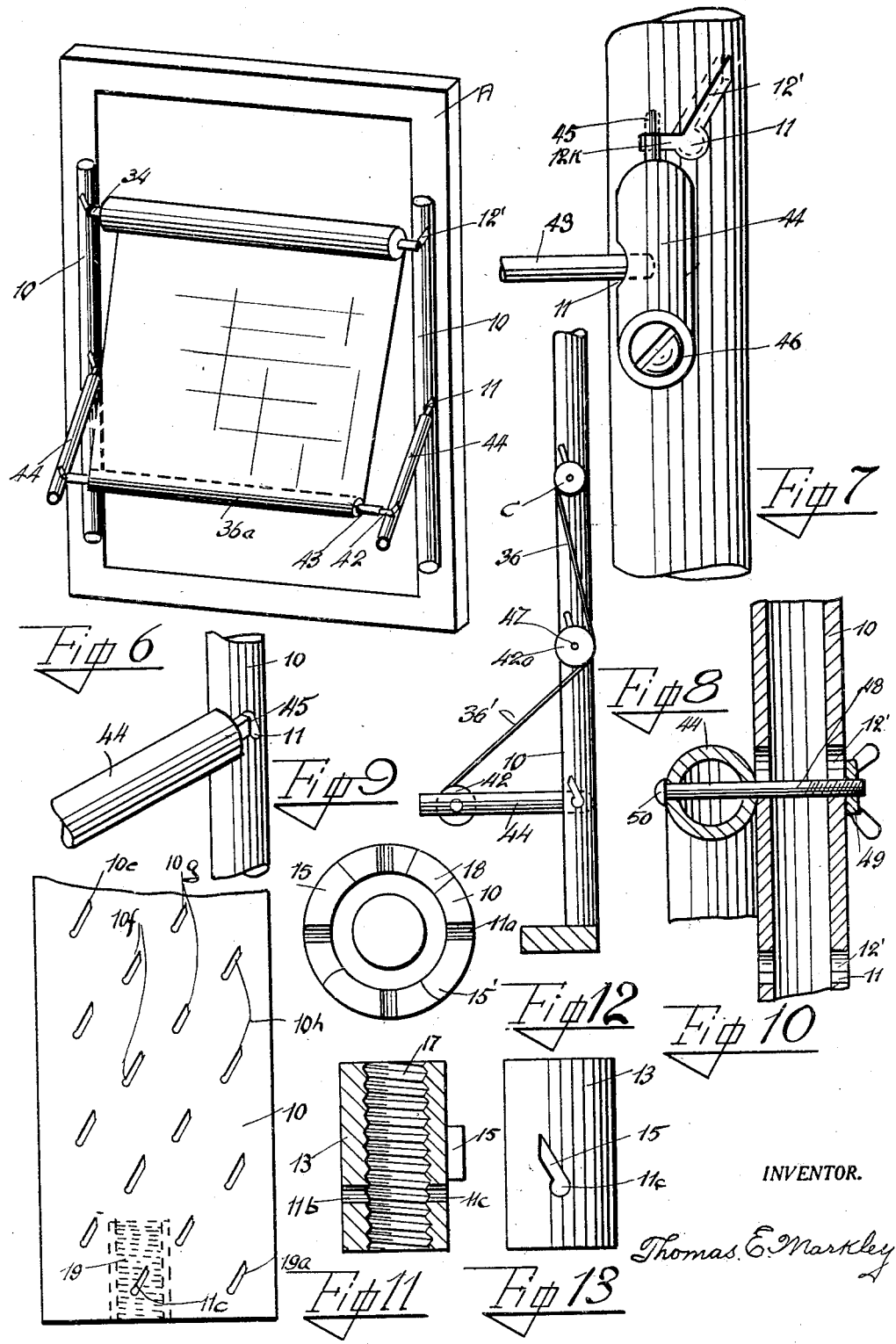

Patented Feb. 24, 1931

1,793,707

UNITED STATES PATENT OFFICE

THOMAS E. MARKLEY, OF LOS ANGELES, CALIFORNIA

SUPPORT

Application filed January 6, 1930. Serial No. 418,819.

This invention relates to supports and frame work of various kinds and for various purposes.

One of the objects of this invention is to provide a construction unit which can be made to occupy a vertical, horizontal, or any other angular position and by virtue of the cut-away portion thereof permit other frame parts to be jointed to the construction unit in a rigid, removable, and knock-down manner.

A still further object of this invention is to provide a number of construction or frame parts by which it is possible to build a temporary structure or set-up characterized by simplicity both as concerns the method of assembling and the means of construction.

A further object of this invention is to provide a certain form of bracket member or construction unit designed to be interchangeably and selectively employed for receiving in a rigid and jointed but removable relationship either a rounded or polygonal terminal of an associated frame part so that one and the same construction unit will serve the desired end of rigidly seating upon itself connected parts which are either designed to remain fixed in position or undergo a specific or relative movement.

A still further object thereof is to provide a support for efficiently and inexpensively uniting in a properly jointed relationship the parts of a given fixture such as a shade roller, awning or the like whereby interchangeable brackets are provided for giving ultimate position to the various parts thereof whether intended to be rigidly mounted or movably mounted.

It is well known that a great many frame parts, forms, and other fixtures are required to be built for temporary use and in most cases these frame parts should be of a knockdown variety. It is often impracticable to employ screws and similar fasteners for building frame work, especially as a means of providing rigid joints for parts arranged in varying angular positions. My invention aims to provide a means for joining together in removable fashion certain frame parts depending upon the frictional interengagement of these parts for retention efficiency, and relying also upon pressure of one part against another for the ultimate angular and removable positioning of one part against another part of the frame work.

A further object thereof is to provide a novel construction unit designed to interchangeably serve in different situations for light or heavy duty and including means for quickly disengaging the connected parts of a complete frame work when the construction unit is used therein. To this end tubular posts or columns or braces are made by associating with a flat sheet or blank an internally threaded bushing around which bushing the flat sheet will be rolled into tubular formation in a manner to allow the bushing to be anchored at any of a number of diagonal slots with which the sheet is provided and which slots are to be employed for seating therein a rounded or polygonal terminal of frame parts.

In carrying out my invention I am able to accomplish certain effects which depend upon the frictional engagement and contact made between one frame part and another frame part and by which a series of diagonal slots in the frame part are made to lend themselves interchangeably to a variety of different uses for the connecting or uniting together in a frame or fixture of associated parts designed to be held together in a knockdown relationship.

And a still further object thereof is to provide a construction unit with means by which there may be joined endwise thereof as well as laterally thereof frame parts in a rigid removable manner so that any height or width of a mechanical or building construction may be quickly and economically produced.

With the above and other objects in view my invention consists in the means for making construction units and applying the same in practice, all as set forth in the specification and claims.

In the drawings, wherein similar reference characters designate similar parts thruout the respective views, Figure 1 is a front elevation, partly in section, showing a mounting for a window shade, Figure 2 is an end elevation of Figure 1, Figure 3 is a perspective view, partly broken away, of a modification of my invention, Figure 4 is a fragmental sectional detail view of my means for increasing the length of a construction unit, Figure 5 is a fragmental detail view, in front elevation, of a construction made by employing my means, Figure 6 is a perspective view of a window frame showing shade supporting means, Figure 7 is a fragmental detail view of a column showing supporting elements, Figure 8 is a fragmental end view of a framework for supporting a shade in an awning-like manner, Figure 9 is a fragmental detail view of a frame unit attached angularly to another frame unit, Figure 10 is a fragmental sectional detail view showing a brace member arranged at an angle to another frame member, Figure 11 is a fragmental plan view of a sheet or blank showing one step in the process of providing a construction unit, Figure 12 is a cross-sectional view showing the slots therein, and Figure 13 shows two views, one in sectional elevation and the other in side elevation of the bushing to be described.

In the drawings, which are merely illustrative of my invention I disclose tubular posts of columns broadly designated 10 and each post is designed to be formed with longitudinally alining angular diagonal slots 12' having base holes 11. These tubular posts are intended for interchangeable use and disposition in any angular formation or relation depending on the kind of mechanical or building structure it is proposed to build in knock-down fashion. Thus in Figure 6 it is intended to provide a support for a window shade by which the shade may be readily converted into an awning. This calls for first securing in vertical position two posts 10, whereby they are mounted upon the side parts of the window frame A. The shade roller is then taken and the polygonal terminal or pintle 35 is let into the diagonal slot so as to lie immovably therein as shown in the case of the batten 39' in Fig. 3; the rounded pintle 39 of the shade roller is received in the diagonal slot of another post, and when downward pressure is exerted upon the shade roller it results in both pintles being held in the opposite posts in such a manner that the polygonal pintle fits the rectilinear through angular slot and the rounded pintle is free to rotate in the base hole of another angular slot, so the shade 36 may be drawn upon and the shade roller rotated. The next step is to take two more but shorter sections of the interchangeably serviceable tubular posts 10 and either provide a rigid terminal pin 37 at one end of each short post or else provide this projecting terminal by inserting a rod 24a in the sleeve or post as shown clearly in Figure 5. The pintles 37 of both posts will be introduced into a pair of upwardly diverging angular slots formed in the vertical posts, and then by pressing downwardly upon these short posts, the latter may be caused to extend outwardly and, if desired, downwardly of the front faces of these posts as shown in Figure 6. If desired the pintles may have hooks 45 at their ends as shown in Fig. 6 which hooks will engage in the edges of the base holes of these diagonal slots, and thus serve to position the posts at an angle to the vertical supporting posts.

The next step will be to insert a tubular post 42 into the fabric bead 36a which extends transversely at the lower end of the shade 36 and then to insert a rod 43 of greater length than this post 42 so their projecting ends may be fitted in the diagonal slots 12' of the brace posts 44; since the ends of the rod 43 will be inserted in the brace posts at their outer ends it will be readily seen that the effect will be to dispose the window shade at a downward inclination with respect to the window frame so it serves as an awning to give privacy from a building window located above the one carrying this shade-awning. In Figure 8 I vary this to the extent that the shade roller C, after being mounted to the front frame posts 10 in the manner already set forth is trained around in back of the idler tubular post 47a through which a rod 47 is passed whose projecting ends will be connected into alining angular slots 12' as the rod is shown to be connected to these posts in Figure 5. The transverse post 42 fitted in the bead 36a of the lower end of the shade is now adapted to have the rod 43 passed therethru and the ends of this rod will be connected in diagonal slots of the securing posts in the manner already disclosed. In this form and arrangement of the window shade the lower portion of the shade is disposed angularly downwardly after it leaves the idler 47a so the upper stretch of the shade designated 36 acts like a shade proper while the lower stretch 36' thereof acts like an awning.

It will be seen from Figure 12 that the base holes 11 and 11a of two rows of slots in the post 10 will aline at diametrically opposite points of this post while the angular or diagonal notches leading therefrom may slope in opposite directions. With the holes thus alining it is possible to use another method of movably or angularly mounting brace posts upon columns. Hence in Figure 10 the brace post 44 will engage the side instead of the front surfaces or faces of the columns 10 and this is accomplished in the following manner. A set screw 48 having one end threaded, has its threaded terminal projecting first thru one pair of alining base holes in the brace post 44, thence passes thru another set of alining holes in the vertical column 10, and the head 50 of this brace post will overlap the brace post, so that a jamb nut 49 may screw upon the set screw 48 and clamp the brace post movably against the column; by friction of the clamping nut 49, it will be readily seen that the brace post may be disposed in any angular position relatively to the vertical posts.

In Figures 1, 2 and 3 a slight modification is shown of the brackets or frame parts for mounting the shade upon. Here the hollow post is made initially from a flat metal sheet or the like which may then be folded and bent to provide the form of mounting shown in Figure 3 where this support is made U-shaped in cross-section with integral terminal or terminals 27 formed upon a projection 28 flattened out from either end of the sheet or blank. Instead of an angular slot a group of alining V-shaped slots is provided in a manner to cause two angular slots to join the base opening, these slots inclining preferably in opposite directions diagonally of the axis of the mounting; these angular slots being designated 40, 41, and the mounting itself is designated 31.

It will be understood that the terminals 27 will be secured by fasteners 26 to a window frame part so that the angular stem thereof, 28, will slope downwardly to space the main body portion of the mounting 31 downwardly towards the lower end of the window frame where a fastener 39 will secure this end of the mounting to the window frame. The pintles, both the polygonal and rounded one of the shade roller may be introduced removably into the angular slots 40, 41 of the mounting in the manner already set forth. The bead 39' of the shade 36 will have its batten 37 placed to assume an angular disposition in the inclined slot 41 of the mounting which will secure the shade 36 in vertically stretched out position so the lower end of the shade will not rattle when a strong wind is blowing. B designates the lower sill portion of the window frame.

When it is proposed to provide a construction unit to permit a frame part to have means for being united with another frame part endwise as well as laterally so as to increase its length as well as to connect same with angular braces I provide a simple and efficient means for this purpose. In building such a construction unit I take a flat sheet metal or other blank 10' shown in Figure 11, preferably of rectangular formation and I punch out of the body portion thereof rows of similarly sized and shaped slots in a manner as follows. Four rows of diagonal slots will be formed in this sheet; the first row of slots being designated 10e, the second row, being staggered with respect to the first row, being designated 10f, the third row being designated 10g staggered relatively to the second row, the third row being designated 10h being a marginal row. The angular slots preferably incline in the same direction. I now take a bushing internally screw threaded as at 17, this bushing being designated 13, and I provide diametrically opposite holes 11b and 11c therein at a convenient point, and then I form preferably integral lugs 15 on one or both sides of the bushing as may be desired, these lugs being of the identically similar size and shape as the angular slots which they are designed to fit. I now take this bushing and insert its lug 15 into an angular slot of say the second row of the slots from the right of the blank shown in Figure 11; I next roll the sheet 10' by folding both marginal ends around the bushing 13 into a tubular formation until another angular slot of say the last row allows the other lug of the same bushing 13 to project thru this angular slot. This will snugly fit the bushing into the rolled and tubular post 10 and in a manner to prevent the bushing from becoming displaced from the post. In Fig. 12 the two lugs 15, 15' of the bushing are shown projected into corresponding slots of the tubular post 10. With this construction unit thus built it will be seen that the bushing has its open threaded end flush with one end of the tubular post 10. This permits the tubular post to be made of any appreciable length, and then same may be cut off at any desired point for the purpose of providing a construction unit serviceable as a column, pedestal, or brace as the case may be. Then if it be further desired to insert a bushing the flat sheet provided with any length of angular slots will be provided, and this sheet may then be cut and the bushing anchored thereto in the manner disclosed and the flat sheet may then be rolled to provide the hollow post, the seam of which is designated 18.

With a construction unit thus constructed and provided with an inside terminal bushing the length of the tubular portion may freely be increased in order to provide the proper height of the pedestal and the like. Thus in Figures 4 and 5 there are secured upon opposing frame parts or members S and T the vertical plates 22 or angular brackets 21, by means of the fasteners 23. A plug 17, fitted in the end of one tubular post 10 in the same manner as the bushing has been anchored therein, will have a threaded stem 20 projecting therebeyond. When now the bushing 17 of one vertically arranged post 10 is caused to contact at its upper end with the under side of the shelf 21 of the bracket (this shelf being provided with a hole 17b) the stem 20 of the plug 17' of the other post 10 whose lower end contacts the opposite surface of this bracket will be screwed home into the bushing 17 of the lower and alining post, until both posts will be clamped to opposite sides of the bracket shelf 21. This will provide a rigid length of column, strong, light, portable and knock-down. In Figure 7 there is disclosed a modified angular slot where the base hole 11 has the angular notch extension 12', but also has a lateral short notch 12K communicating with the base hole 11 and disposed in a plane at right angles to the axis of the tubular post 10; this will be particularly well adapted for ultimately receiving the polygonal end of a shade roller. I do not limit myself to the exact details herein disclosed but claim all variations falling within purview of the claims.

What I desire to secure by Letters Patent is:

1. In combination, a tubular post rolled from a metal sheet having four longitudinal rows of staggered openings, each opening composed of a rectilinear slot arranged diagonally of the sheet having a lower lateral round hole, and an internally threaded bushing fitted in and arranged flush with one end of the post and having a diagonal lug snugly projecting into the diagonal slot of one opening in the post as a means of retention in said tubular post.

2. In combination an internally-threaded bushing having at diametrically opposite points diagonal lugs, and a metal strip of greater length than said bushing and having spaced apart diagonal slots, said metal strip being rolled around so as to embrace the bushing so as to provide a tubular body, the lugs of the bushing being caused to project into said spaced apart diagonal slots in order to hold the bushing against displacement from the metal strip.

3. As a new article of manufacture a tubular post formed with longitudinal rows of diametrically oppositely arranged holes having rectilinear slot extensions disposed diagonally of the axis of the post, and a threaded bushing held at one end in said post and having integral projections fitting diametrically opposite slots of said post.

4. In combination a pair of vertical oppositely arranged posts, a series of superposed tubular bodies each having a rod projecting therethru to expose terminals thereof, a post having longitudinal series of diagonal slots formed therein with lowermost round holes disposed laterally thereof, the terminals of each rod being inserted into the upper parts of opposite diagonal slots of said posts and pressed downwardly of said slots so as to be wedged home in the rounded holes of said slots.

5. A device as described consisting of a window frame, a pair of vertical posts arranged on opposite sides of the window frame and having each a vertical series of diagonally disposed slots with lower lateral round holes providing seats, a shade having roller pintles introduced into two upper slots to be wedged home into the seats thereof, a pair of tubes having each a rod one of whose terminals projects thru the tube and is wedged home into a seat of another slot so as to hold the tube forwardly of the frame at right angles to the shade roller, each of the said tubes having a longitudinal row of diagonal slots with lower hole seats, a third tube having a rod therein whose terminals are wedged home in the seats of other diagonal slots of the vertical posts so the tube rolls on the rod, and a fourth tube with rod therein similarly formed as the third tube and rod and having the rod terminals wedged home in the seats of two slots of the pair of second-named tubes, the shade passing from its roller around the back of the third tube and being rolled operatively around the fourth tube, whereby the shade is converted into an awning.

6. In a device as described, in combination, a pair of oppositely arranged vertical tubes, means for fixedly supporting said vertical tubes, said tubes having each a longitudinal series of diagonally arranged slots having lower seat holes, a second pair of tubes also having longitudinal series of diagonal slots with seat holes, screw bolts passing through the seat holes of the slots in the vertical tubes to dispose the second tubes laterally and at right angles to the vertical tubes for a swinging adjustable movement, nuts engaging the screw bolts to lock them in adjusted position and a shade connected stay rod having its opposite terminals wedged home in the two seat holes of the two adjustable tubes.

7. In combination a flat sheet rolled into tubular formation with contacting edges, said sheet and tubular body having diametrically opposite pairs of longitudinally separated slots arranged diagonally of the length of the body, and having lower lateral seat holes an internally threaded bushing formed at diametrically opposite points with holes and with laterally projecting diagonal lugs, said bushing fitting into one end of the tubular body with its holes registering with diametrically opposite holes of said tubular body and with its diagonal lugs projecting thru the diagonal slots of the last-mentioned holes.

8. As a new article of manufacture a pair of longitudinally alined surmounted hollow bodies each formed with circumferentially arranged longitudinally separated rows of diagonal slots having seat holes, a bushing arranged snugly in the confronting ends of both hollow bodies and having diagonal lugs seated in the diagonal slots of opposite openings and having holes registering with the latter holes, one bushing being internally screw-threaded and a screw plug having one end screwed firmly into the other bushing and its free threaded terminal screwed removably into the internally screw threaded bushing to connect both hollow bodies rigidly together.

In witness whereof he has hereunder set his hand this 17th day of December, 1929.

THOMAS E. MARKLEY.